United States Patent [19]
Yang

[11] Patent Number: 5,265,488
[45] Date of Patent: Nov. 30, 1993

[54] DOUBLE-ACTING TYPE DYNAMIC BACK SPACING REMOVED DRIVING SYSTEM

[76] Inventor: Tai-Her Yang, 5-1 Taipin St., Si-Hu Town, Dzan-Hwa, Taiwan

[21] Appl. No.: 862,714

[22] Filed: Apr. 3, 1992

[51] Int. Cl.⁵ ............................................. F16H 55/24
[52] U.S. Cl. ........................................ 74/427; 74/409; 74/810.1
[58] Field of Search ..................... 74/409, 427, 810.1

[56] References Cited

U.S. PATENT DOCUMENTS

| | | | |
|---|---|---|---|
| 1,274,918 | 8/1918 | Maag | 74/427 |
| 5,090,267 | 2/1992 | Gramling | 74/427 |

FOREIGN PATENT DOCUMENTS

| | | | |
|---|---|---|---|
| 1182504 | 2/1959 | Fed. Rep. of Germany | 74/427 |
| 55-126156 | 9/1980 | Japan | 74/409 |

*Primary Examiner*—Allan D. Herrmann
*Attorney, Agent, or Firm*—Leonard Bloom

[57] ABSTRACT

A double-acting type dynamic back spacing removed driving system comprises non-reversible transmission worm gear and worm set including two sets of worms coupling with worm gear. When the system is driven, one prime worm continues applying rotary driving force. Whether or not the worm gear is driven, such force would engage upon the prime worm permanently, and another set of worm gear (or co-axially secured at respective worm gear with same or different pitch), due to application worm applies force to worm gear permanently. The displacement-controlling worm is packed always due to worm set being non-reversibly transmitted so no spacing appears between the worm gear and the worm. At this moment, when the displacement-controlling worm is driven backward against compressed direction, and worm gear set is engaged in chasing displacement to reach packing condition again due to being driven by applied prime worm to form self-adjusting speed difference dynamic back spacing removed driving system according to load back spacing state. This principle can be used to accomplish dynamic back spacing removal when operation speed of displacement-controlling worm is lower than application prime worm.

4 Claims, 2 Drawing Sheets

DOUBLE-ACTING TYPE DYNAMIC BACK SPACING REMOVED DRIVING SYSTEM

SUMMARY OF THE INVENTION

The present invention relates to a double-acting type dynamic back spacing removed driving system which comprises a non-reversible transmission worm gear and worm set including two sets of worms coupling with a worm gear. When the system is driven, one prime worm continues applying rotary driving force, and whether or not the worm gear is driven, such force continues to engage the prime worm permanently. A second prime worm is to control displacement and also couples with another worm gear (or is co-axially secured to the respective worm gear with the same or different pitch). Due to the different driven speeds of the two sets of worms when rotating in opposite directions, a tensive state is produced between the threads of the two sets of worms and the worm wheel and back-lash is eliminated. On rotation in one direction, one set of worms is driven faster and the other set is driven more slowly. When the direction of rotation is reversed, the respective speeds of the sets of worms are also reversed. The speed difference in either direction of rotation is taken up by one set of torsion limiting transmission devices so that back lash is eliminated.

DETAILED DESCRIPTION OF THE INVENTION

Figure 1:
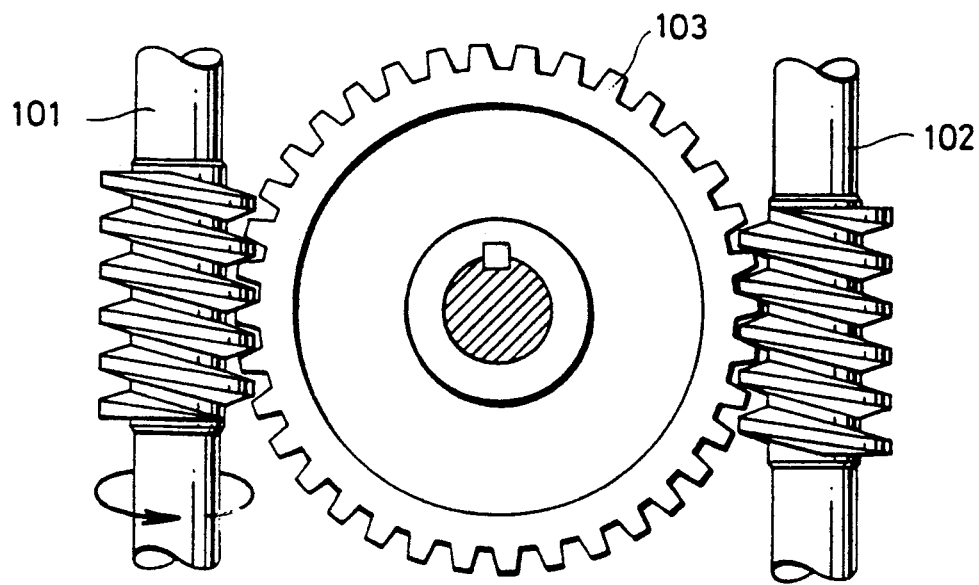
FIG. 1 is a diagram showing the basic principle of double-acting type dynamic back spacing removed driving system according to the present invention.

The present invention relates to a double-acting type dynamic back spacing removed driving system comprising a non-reversible transmitted worm gear and worm set. FIG. 1 is a diagram showing the basic principle of double-acting type dynamic back spacing removed driving system, including two sets of worm 101, 102 coupling with a worm gear 103. When the system is driven, one prime worm 101 continues applying force to prime worm gear 103. Regardless of whether the worm gear is driven or not, force would engage upon the prime worm permanently, and another set of worm is to control displacement and also couples with another worm gear 103 (or is co-axially secured at respective worm gear with the same or different pitch). Due to the application, worm 101 applies force to worm gear 103 continuously. Displacement-controlling worm 102 is always pressed against the worm gear 103. The worm set does not transmit reversibly. When the displacement-controlling worm 102 is driven backward against the direction of the applied force, the worm gear set 103 is engaged in a chasing displacement to reach a driven condition again due to being driven by the applied prime worm 101 to form a self-adjusting speed difference dynamic back spacing removed driving system. Dynamic back spacing removal is accomplished when the operational speed of displacement-controlling worm is lower than the speed of the application prime worm.

Figure 2:
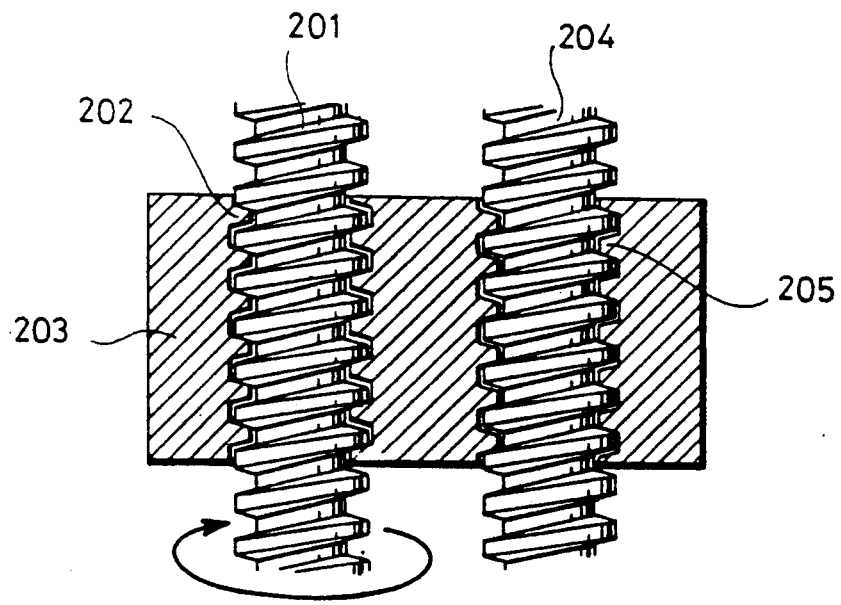
FIG. 2 is an embodiment of driving device linear load comprising worm and nut set in place of the worm gear set according to the present invention.

FIG. 2 is an embodiment of driving device linear load comprising the worm and nut set in place of said worm gear set. The application prime worm 201 is provided to apply thrust or tension within a limited scope against linear load 203 with nut set 202. Another displacement-controlling worm 204 is released back toward the direction of being depressed, so power worm 201 is engaged in forward drive to form a self-adjusting speed difference dynamic without a back-spacing operation function.

Said application prime mechanism also can comprise a reversible device such as: driving for the worm gear can be a reversible rotary force such as a gear set or belt friction wheel set to apply torsion within a limited scope to the worm gear to match the non-reversible transmitted displacement-controlling worm. The match of the application prime mechanism against the linear load also can be changed into a linear fluid-dynamic cylinder or linear gear train driven by a gear driving force within an oriented limited scope. Said worm gear type linear load is called the application prime body, and the displacement-controlling worm is called the displacement controlling body.

The system disclosed by the respective embodiments according to the present invention as mentioned above may be viewed as follows.

A non-reversible transmitted passive body A, has two prime bodies coupling with it to provide the source of power. These are an application prime body B and a displacement-controlling prime body C. Either the application prime body B or the displacement-controlling prime body C can apply transmission (torsion) against the non-reversible transmitted passive body A, and the non-reversible transmitted passive body A can engage in non-reversible transmission against the application prime body B and the displacement-controlling prime body C. The non-reversible transmitted passive body A can be a worm or other type of driven rotary member, the application prime body B and the displacement-controlling prime body C can be a worm set. Alternately, the non-reversible transmitted passive body A can be a passive body with a transmission nut, and the application prime body B and the displacement-controlling prime body C can be a worm set to form double-acting self-adjusting speed difference dynamic back spacing removed driving system.

The relationship between the application prime body B, the displacement-controlling prime body C and the non-reversible transmission passive body A are as follows: In the static state, the application prime body B and the displacement-controlling prime body C are static but the application prime body B applies thrust with respect to the coupling portion of the non-reversible transmission passive body A. The displacement-controlling prime body C appears in a blocked fitting position with respect to the coupling portion of the non-reversible transmission passive body A. The non-reversible transmission passive body A with respect to the displacement-controlling prime body C, is in a non-reversible transmission condition so that there is no pressure (or torsion) between the non-reversible transmission passive body A and the displacement-controlling prime body C. When the displacement-controlling prime body C is driven in the opposite direction against the direction of bearing pressure, the passive body A will be engaged in chasing drive depending upon the release driving volume of the displacement-controlling prime body C to form self-adjusting speed difference double-acting type dynamic back spacing driving system in compliance with load back spacing state. When the displacement-controlling prime body C stops, the system remains at the original state with no back-lash.

The double-acting type dynamic back-spacing removed driving system comprising said prime body B and displacement-controlling prime body C and passive body A can be reversed so that the initial prime body B becomes the displacement-controlling prime body C and the initial displacement controlling prime body C becomes the prime body B. Thus for example for clockwise driving, the initial prime body is B and the displacement-controlling prime body is C. However, for counter-clockwise driving, the initial prime body B becomes the displacement controlling prime body C' and the initial displacement controlling prime body C becomes the prime body B'.

The source of driving for said application prime body B and the displacement-controlling prime body C may include a common power source or respectively an independent power source wherein the relationship between the driving speed BS of the power source for the application prime body B and the driving displacement speed CS of displacement-controlling is BS>CS and the self-adjusting speed difference is subject to load back lash wherein BS includes a still state with driving static driving pressure.

The construction of said driving power is described as below:

Separate type driving system: the construction is provided as the prime body driving body for fixed torsion driving operation, and its fixed torsion type includes electrical-control type based on current control and fixed torsion type based on mechanical type. The driving type for the displacement-controlling prime body includes that based on rotary driving function from manpower, step motor, servo motor, common type DC motor and general mechanical power controlling driving, and fluid motor, etc..

Joint type driving system: a single rotary power source such as manpower, step motor, servo motor, common type DC motor and general mechanical power controlling driving, and fluid motor, etc. It is characterized by: rotary power source transmitted through a gear train to the prime body to enable the passive body actuating speed to be higher than the rotational speed of the passive body driven by the displacement-controlling prime body. Rotary power transmitted to the prime body is through a mechanical or solenoid type slidably rotary coupling device permitting selection of the necessary torsion, subject to the requirement for coupling thereof as well as balancing the speed difference between the prime body and the displacement-controlling prime body of the system.

Figure 3:
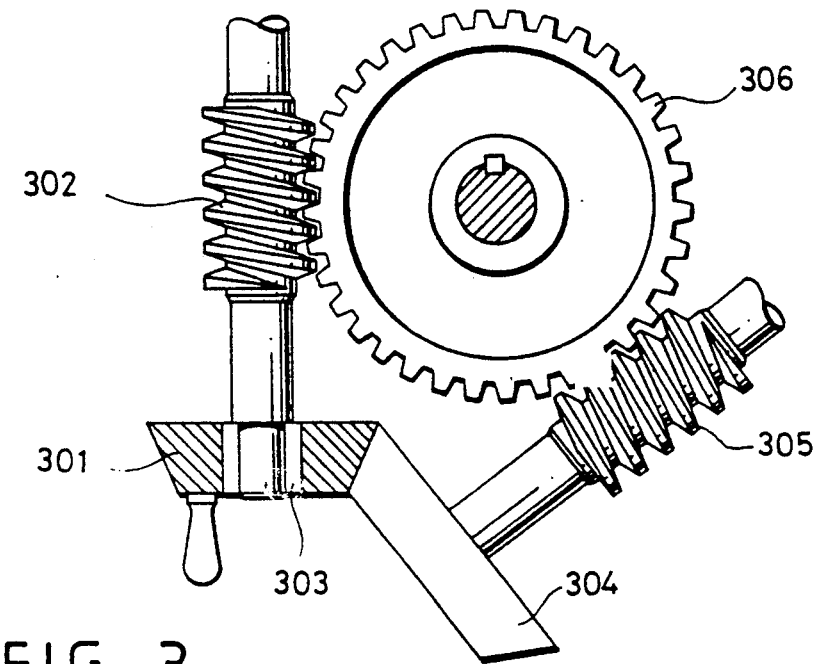
FIG. 3 is an embodiment of the present invention applied to single driving shaft for joint driving.

FIG. 3 is an embodiment of single driving-shaft joint drive wherein minor gear 301 with handle (or means for accepting mechanical power drive) is coupled in the direction of rotation of the prime worm 302 through a slidably torsion limiting device 303. Reversed speed-reduction gear 304 coupled with minor gear 301 is provided to offer speed reduction. Reversed rotary power is for driving the displacement-controlling worm 305. For joint driving of the worm set 306 both forward and reverse, the prime worm is engaged in self-adjusting speed difference double-acting type dynamic back spacing removed driving in compliance with load back spacing state. The slidably torsion limiting device includes solenoid and mechanical types.

Figure 4:
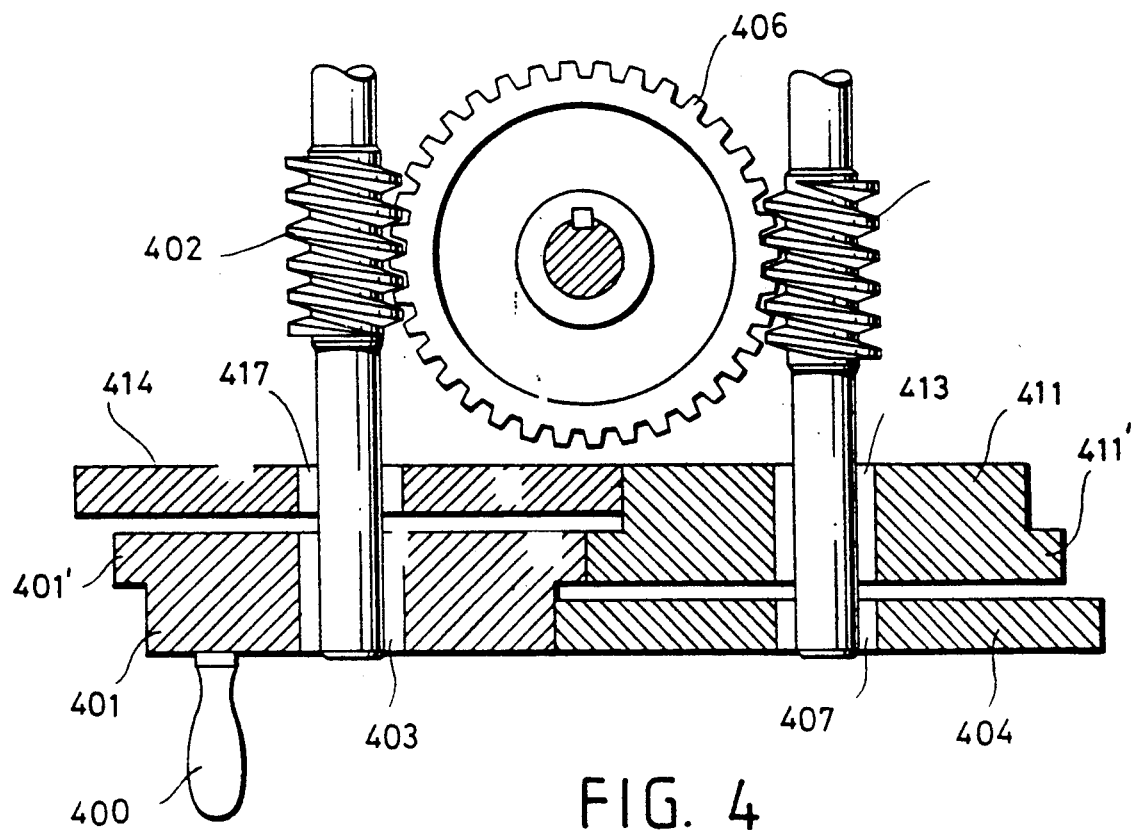
FIG. 4 is an embodiment of the present invention applied to double-driving shaft for joint driving.

FIG. 4 is a joint driving embodiment of double-acting shaft wherein minor gear 401 with handle 400 (or rotary power input member for accepting mechanical power drive) is coupled in the same direction of rotating the prime worm 402 through a slidably torsion limiting device 403, and reversed speed reduction gear 404. Coupling with minor gear 401 is provided to offer speed reduction but reversed rotary power is through a one-way transmission device 407 for coupling with the displacement-controlling worm 405. When speed-reduction gear 404 is driven in reverse the accompanying prime worm jointly drives worm gear set 406 for self-adjusting speed difference double-acting type dynamic back spacing removed driving. The displacement-controlling worm 405 is coupled to a second prime minor gear 411 by means of a slidably torsion limiting device 413. The reversed speed-reduction gear 404 is coupled with minor gear 401 to offer speed reduction. Reversed rotary power is through a one-way transmission device 417 for gearing displacement-controlling worm 405 when speed-reduction gear 404 is engaged in reversed driving and further accompanying prime worm jointly drives worm gear Bet 406 in reversed direction for self-adjusting speed difference double-acting type dynamic back spacing removed driving. Transmission gears 401' and 411' are coupled to each other between said first prime minor gear 401 and the second prime minor gear 411 (or comprising intermediate gear or other transmission device), and both have a reversed transmission relationship so as to drive the worm gear respectively when the handle 400 or rotary power input member is driven in a clockwise or counter-clockwise direction. The slidably torsion limiting device may include a solenoid type or a mechanical type and the gearing device may be an umbrella gear, straight gear or other gearing device depending upon the type of structural space.

Due to the different driven speeds of the two sets of worms when rotating in opposite directions a tensive state is produced between the threads of the two sets of worms and the worm wheel, and back-lash is eliminated. On rotation in one direction, one set of worms is driven faster and the other set is driven more slowly. When the direction of rotation is reversed, the respective speeds of the sets of worms are also reversed. The speed difference in either direction of rotation is taken up by one set of torsion limiting transmission devices so that back lash is eliminated.

Said related driving displacement structure device can be mounted with displacement detecting device and position detecting device to increase the convenience.

I claim:
1. A double-acting driving system comprising:
a non-reversible passive body, a first prime body and a second prime body, both prime bodies coupled to the passive body,
the first prime body being connected to a first speed reduction gear by a first one-way transmission device, the first prime body further being connected to a first transmission gear by a first torsion limiting device,
the second prime body being connected to a second transmission gear by a second torsion limiting device and further being connected a second speed reduction gear by a second one-way transmission device, the first speed reduction gear being coupled to the second transmission gear, the second transmission gear being coupled to the first transmission gear and the first transmission gear being coupled to the second speed reduction gear, a driving means connected to the first transmission gear wherein when the driving means moves in a clockwise direction, torque is transmitted through the first torsion limiting device to the first transmission gear, to the second speed reduction gear, to the second one-way transmission device, to the second prime body, thereby driving the passive body and any backlash from the first prime body is prevented from being transmitted through the first one-way transmission device, further wherein, when the driving means moves in a counter-clockwise direction, torque is transmitted through the first torsion limiting device to the first transmission gear, to the second transmission gear, to the first speed reduction gear, to the first one-way transmission device, to the first prime body, thereby driving the passive body and any backlash from the second prime body is prevented from being transmitted through the second one-way transmission device.

2. The system of claim 1, wherein the first and second torsion limiting devices each have a selected torsion limit which, when exceeded, produces slippage in the respective torsion limiting devices and prevent the transmission of the torsion therein.

3. The system of claim 1, wherein the passive body is a driven rotary member.

4. The system of claim 1, wherein the driving means is a rotary power input member.

* * * * *